US012711542B2

(12) United States Patent
Anzalone et al.

(10) Patent No.: US 12,711,542 B2
(45) Date of Patent: Aug. 18, 2026

(54) PREDICTIVE AND CUSTOMIZABLE ROUND UP PLATFORM

(71) Applicant: American Express Travel Related Services Company, Inc., New York, NY (US)

(72) Inventors: Christina Anzalone, New York, NY (US); Amanda Kanefsky, New York, NY (US); Muzeebullah Syed, New York, NY (US); Rajan Sadasivan, Palo Alto, CA (US); Mordehai Moty Mondiano, Phoenix, AZ (US); Alaric M. Eby, Scottsdale, AZ (US); Joshua Block, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/515,840

(22) Filed: Nov. 1, 2021

(65) Prior Publication Data

US 2023/0133354 A1 May 4, 2023

(51) Int. Cl.
*G06Q 40/02* (2023.01)
*G06F 3/0482* (2013.01)
*G06Q 20/34* (2012.01)

(52) U.S. Cl.
CPC ......... *G06Q 40/02* (2013.01); *G06Q 20/3552* (2013.01); *G06Q 20/357* (2013.01); *G06F 3/0482* (2013.01)

(58) Field of Classification Search
CPC ... G06Q 40/02; G06Q 20/3552; G06Q 20/357
See application file for complete search history.

(56) References Cited

U.S. PATENT DOCUMENTS 8,224,747 B2 * 7/2012 Kumar .................. G06Q 20/40 707/622
8,781,965 B2 * 7/2014 Huster ................ G06Q 20/327 705/44

(Continued)

FOREIGN PATENT DOCUMENTS

EP 4365773 A1 * 5/2024 ............. H04L 45/08
WO WO-2017008144 A1 * 1/2017 ........... G06F 21/604
WO WO-2022066179 A1 * 3/2022 ........... G06F 9/5016

OTHER PUBLICATIONS

Chiang, C., et al., "An Event Driven Architecture for Application Integration using Web Services," IEEE (Year: 2005).*

(Continued)

*Primary Examiner* — Daniel S Felten
(74) *Attorney, Agent, or Firm* — Thomas | Horstemeyer LLP.

(57) ABSTRACT

Disclosed are various embodiments for predicting and customizing round-ups for various types of transaction. First, a computing device can access adjustment criteria for a user profile. The computing device can then generate an event listener configured to monitor events made in association with the user profile. When events are accessible by the event listener, the events are filtered or otherwise analyzed to identify a subset of the events that comply with the adjustment criteria. Individual ones of the events in the subset are adjusted by performing a round-up operation. The round-up operation can include adjusting a transaction amount by a predetermined amount and depositing the predetermined amount into the destination account.

20 Claims, 10 Drawing Sheets

(56) References Cited

U.S. PATENT DOCUMENTS

| | | | | |
|---|---|---|---|---|
| 8,838,707 | B2 * | 9/2014 | Lawson | H04L 51/52 709/206 |
| 9,811,820 | B2 * | 11/2017 | Pitroda | G06Q 20/10 |
| 9,824,393 | B2 * | 11/2017 | Joseph | G06Q 20/10 |
| 9,967,224 | B2 * | 5/2018 | Lawson | H04L 51/212 |
| 10,092,071 | B1 * | 10/2018 | Sutovsky | A45F 3/04 |
| 10,937,097 | B1 * | 3/2021 | Cruttenden | G06Q 20/405 |
| 11,176,614 | B1 * | 11/2021 | Cruttenden | G06Q 40/06 |
| 2003/0083936 | A1 | 5/2003 | Mueller et al. | |
| 2005/0251460 | A1 * | 11/2005 | Quigley | G06Q 10/10 705/27.2 |
| 2013/0030992 | A1 * | 1/2013 | Carretta | G06Q 20/10 705/39 |
| 2013/0054332 | A1 | 2/2013 | Ross et al. | |
| 2013/0179245 | A1 * | 7/2013 | Simonoff | G06Q 30/0222 705/14.23 |
| 2014/0108237 | A1 | 4/2014 | Carretta et al. | |
| 2015/0032521 | A1 * | 1/2015 | Calman | G06Q 20/10 705/14.17 |
| 2017/0068943 | A1 | 3/2017 | Narayana et al. | |
| 2018/0096423 | A1 * | 4/2018 | Joseph | G06Q 40/02 |
| 2018/0310008 | A1 * | 10/2018 | Kopietz | H04N 19/85 |
| 2019/0034809 | A1 * | 1/2019 | Xu | G06N 5/022 |
| 2020/0210975 | A1 * | 7/2020 | Carretta | G06Q 20/40 |
| 2020/0286174 | A1 * | 9/2020 | Pessin | G06Q 40/03 |
| 2021/0174451 | A1 | 6/2021 | Cruttenden et al. | |
| 2021/0295287 | A1 * | 9/2021 | Fitzgerald | G07F 17/3244 |
| 2021/0349475 | A1 * | 11/2021 | O'Regan | G06Q 20/3224 |
| 2021/0390591 | A1 * | 12/2021 | Soderstrom | G06Q 20/102 |
| 2021/0390593 | A1 * | 12/2021 | Soderstrom | G06F 16/9035 |
| 2022/0067799 | A1 * | 3/2022 | Soderstrom | G06Q 20/40155 |
| 2022/0188933 | A1 * | 6/2022 | Cruttenden | G06Q 40/06 |
| 2022/0215443 | A1 * | 7/2022 | Soderstrom | G06Q 20/3224 |
| 2023/0245101 | A1 * | 8/2023 | Quigley | G06Q 20/38215 705/65 |
| 2025/0061141 | A1 * | 2/2025 | Neervannan | G06F 16/3344 |
| 2025/0156828 | A1 * | 5/2025 | Sliwka | H04L 9/3247 |

OTHER PUBLICATIONS

International Search Report and Written Opinion in PCT/US2022/078642 mailed Feb. 23, 2023.

* cited by examiner

PREDICTIVE AND CUSTOMIZABLE ROUND UP PLATFORM

BACKGROUND

Providers of transaction cards and other payment instruments often provide various rewards to incentivize customers to sign up for and regularly use their payment instruments. Examples of rewards include points that may be redeemed by the customers for travel and other incentives, interest-free enrollment periods, threshold point accumulation incentives, among others. Some banks offer debit cards that provide customers of the bank the ability to round up a transaction to a nearest dollar and move a portion of the transaction from the checking account to the savings account. However, to date, there have been no incentives for credit card consumers to round up transactions for savings-related purposes and prior processes are not customizable. Further, banks require consumers to maintain both a checking and a savings account in order to round up a transaction and deposit a portion into a savings account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
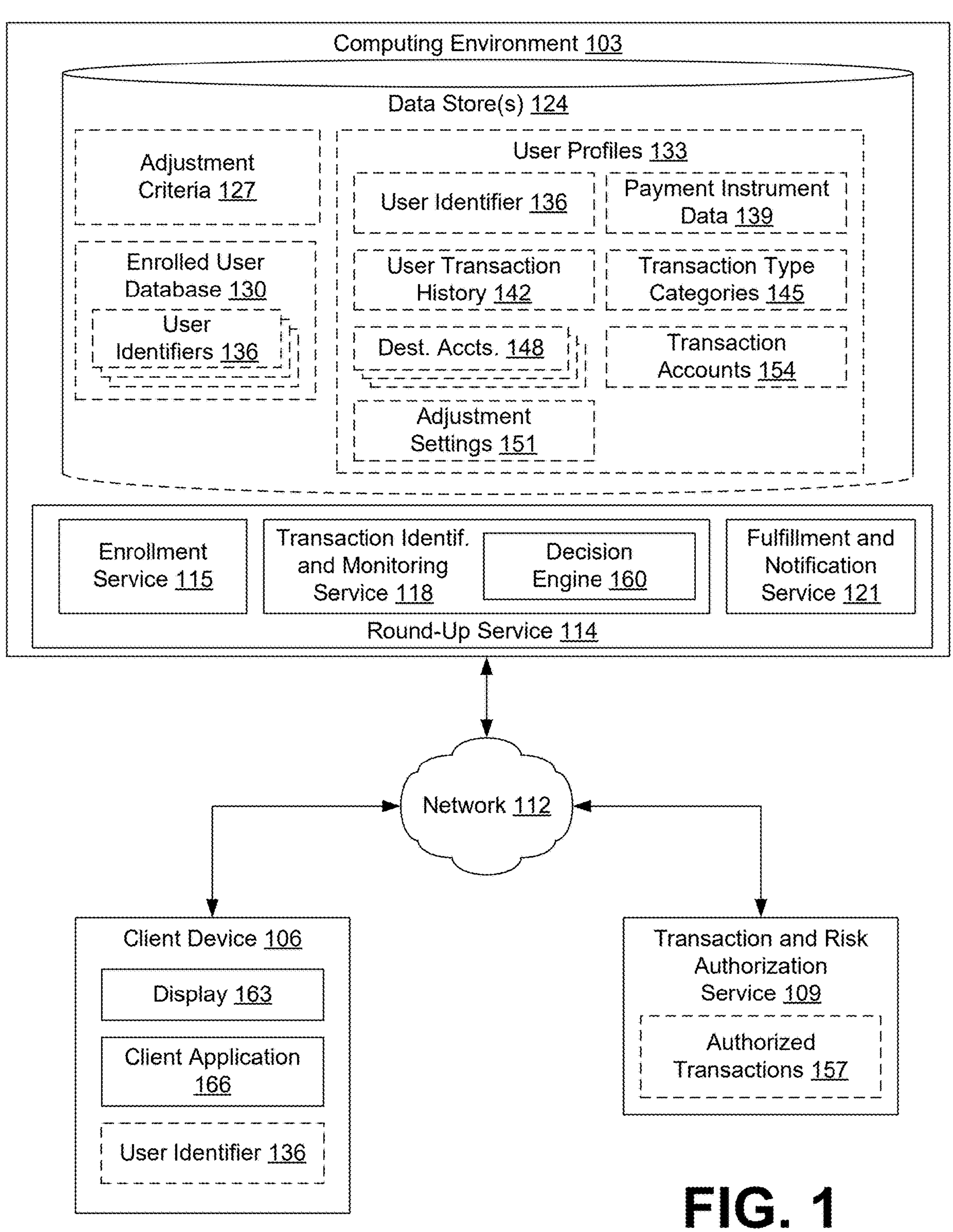
FIG. 1 is a drawing of a network environment according to various embodiments of the present disclosure.

Disclosed are various approaches for adjusting a transaction to perform a round-up operation based on the transaction complying with compliance criteria specified by a user of an instrument. Further, various approaches are disclosed for forecasting savings over predefined time intervals and generating suggested configurations to reach predefined saving goals over various time intervals.

The various approaches described herein provide improvements in the performance of computing devices and networked environments. For example, an event listener is described that is a virtual computing process that subscribes to particular events of interest as opposed to analyzing each and every authorized event generated by a remote service. This decreases complexity of databases queries and reduces the number of queries, utilizing fewer computing resources and less memory. Additionally, less data is transmitted over the network, resulting in improvements in bandwidth and network latency.

Further, in order to improve computational efficiency, minimize query time, and reduce network latency, an enrolled user database is described that maintain user identifiers for user profiles enrolled with a round-up service. A filtering process is described such that, when events are identified, instead of querying a potentially massive database of every user profile, only the enrolled user database is queried to determine whether a transaction should be adjusted by the round-up service, resulting in a speedup of query responses and an analysis of less data.

In a first aspect, a system is described having a computing device that accesses adjustment criteria for a user profile, where the adjustment criteria can be criteria defined by a user enrolled with a round-up service. The computing device can generate an event listener, where the event listener can include a virtual computing process (or "virtual process" for short) in some examples. The event listener can be configured to monitor events made in association with the user profile. When events, such as transactions, are accessible by the event listener, the event listener can filter the events to identify a subset of the events that comply with the adjustment criteria. Individual ones of the events in the subset can be adjusted by performing a round-up operation. The round-up operation can include adjusting a transaction amount by a predetermined amount and depositing the predetermined amount into a destination account specified by the user.

In some aspects, the computing device can generate and send at least one user interface to a client device associated with the user profile. The computing device can then generate the adjustment criteria in response to a specification of the destination account and an instrument made in the at least one user interface. The adjustment criteria as generated can include a transaction type category and a round-up value selected or otherwise provided in the at least one user interface of the client application. Further, in some aspects, the computing device can access historical transaction data for the instrument and, prior to the adjustment criteria being generated, determine an estimated savings over a predetermined time interval based at least in part on the historical transaction data.

In some examples, the computing device can determine that a first one of the transactions is associated with a first category, determine a first round-up value associated with the first category, and adjust the first one of the transactions to the first round-up value. Further, the computing device can determine that a second one of the transactions is associated with a second category, determine a second round-up value associated with the second category, and adjust the second one of the transactions to the second round-up value. Additionally, the computing device can determine a first adjustment amount that is a difference between an amount of the first one of the transactions and the first round-up value, determine a second adjustment amount that is a difference between an amount of the second one of the transactions and the second round-up value, and deposit the first adjustment amount and the second adjustment amount in the destination account.

In a second aspect, a method is described that comprises accessing a specification of an instrument, a round-up value, a transaction type category, and a destination account from at least one user interface of a client application, and generating adjustment criteria based at least in part on the transaction type category and the instrument. When transactions are approved by a transaction service, the method can include identifying a subset of the transactions that comply with the adjustment criteria, and adjusting individual ones of the transactions in the subset by performing a round-up operation on the individual ones of the transaction. Like the example above, the round-up operation can include adjusting a transaction amount of the individual ones of the transactions based at least in part on the round-up value. The method can further include depositing an adjustment amount into the destination account, where the adjustment amount is a difference between the transaction amount and the round-up value.

In additional aspects, the method can include enrolling a user profile with a database of enrolled users, where the user profile is associated with or the profile that made the specification of the instrument, the round-up value, the transaction type category, and the destination account. Thereafter, the method includes identifying a subset of the transactions based at least in part on a filtering of authorized transactions using the database of enrolled users. Filtering of the authorized transactions can include determining whether individual ones of the authorized transactions are associated with a particular user identifier associated with the instrument, and determining that the individual ones of the authorized transactions are associated with the transaction type category based at least in part on a categorization of the individual ones of the authorized transaction.

In some aspects, the method can include accessing user transaction history data for the user profile and, based on the specification of the instrument, the round-up value, and the transaction type category, predicting a savings amount over a predefined time interval. The savings amount as predicted can be displayed in the at least one user interface. In some examples, predicting the savings amount over the predefined time interval includes training a machine learning routine and providing the machine learning routine with the instrument, the round-up value, and the transaction type category. The machine learning routine can be configured to output the savings amount as predicted.

In some aspects, the method can include spawning an event listener configured to monitor the transactions made in association with a user profile, and subscribing the event listener with the transaction service such that, when authorized transactions associated with the user profile are detected, the transaction service notifies the event listener. Prior to receiving the specification of the instrument, the round-up value, and the transaction type category from the at least one user interface of a client application, the method can include receiving a specification of a savings goal in the at least one user interface, and generating at least one suggestion for the instrument, the round-up value, the transaction type category that, if selected, satisfies the savings goal.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, a network environment 100 is shown according to various embodiments. The network environment 100 can include a computing environment 103, one or more client device 106, and a transaction and risk authorization service 109 (also referred to as a transaction service 109 or a remote service for short). The computing environment 103, the client device(s) 106, and the transaction and risk authorization service 109 can be in data communication with each other via a network 112.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a round-up service 114 as well as other applications, services, processes, systems, engines, or functionality not discussed in detail herein. The round-up service 114 can include, for example, an enrollment service 115, a transaction identification and monitoring service 118, a fulfillment and notification service 121, and other applications, services, processes, systems, engines, or functionality not discussed in detail herein.

Also, various data is stored in a data store 124 that is accessible to the computing environment 103. The data store 124 can be representative of a plurality of data stores 124, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the data store 124 is associated with the operation of the various applications or functional entities described below. This data can include one or more adjustment criteria 127, an enrolled user database 130, user profiles 133, and potentially other data.

Adjustment criteria 127 can represent criteria for selecting events, such as transactions, to adjust based on a configuration of a user. Examples of adjustment criteria 127 can include various instruments, such as payment instruments (e.g., transaction cards), transaction type category, adjustment data (e.g., adjustment amounts) associated with one or more transaction type categories, etc. As such, transactions and other events can be compared to the adjustment criteria 127 customizable by a user and, if a sufficient match is determined, the transactions can be adjusted as specified by the user.

The enrolled user database 130 can represent data pertaining to user profiles 133 enrolled with the round-up service 114. For instance, each user having an online profile may not wish to enroll with the round-up service 114. In order to improve computational efficiency, minimize query time, and reduce network latency, the enrolled user database 130 is updated to maintain user identifiers 136 for each user profile 133 enrolled with the round-up service 114. When evets, such as transactions, are identified, instead of querying a potentially massive database of every user profile 133, only the enrolled user database 130 is queried to determine whether a transaction should be adjusted by the round-up service 114.

User profiles 133 can represent information about individual consumers who purchase goods or services using payment instruments (e.g., debit cards, credit cards, charge cards, etc.), or instruments for short, for transactions authorized by the transaction and risk authorization service 109. Accordingly, a user profile 133 can include a user identifier 136, instrument data 139, a user transaction history 142, transaction type categories 145 specified in association with the user profile 133, one or more destination accounts 148, adjustment settings 151, transaction accounts 154, as well as other data. The user identifier 136 can represent any identifier that uniquely identifies a user, and therefore the user profile 133, with respect to another user or user profile 133. For example, the user identifier 136 can include a string of alphanumeric characters that uniquely identifies a user profile 133.

The instrument data 139 can include payment instruments associated with the user profile 133, such as one or more transaction cards (e.g., debit cards, credit cards, charge cards, etc.). For example, a user could have multiple debit cards, credit cards, charge cards, stored-value payment instruments, etc. under his or her control. Each of these instruments could be represented as a transaction account 154 associated with the user profile 133. In some examples, transaction accounts 154 include credit, debit, or checking accounts that are used to perform a purchase. Each transaction account 154 can include its own unique transaction account identifier, such as payment card numbers that comply with the ISO/IEC 7812 standard.

The user transaction history 142 can include past transactions performed using the one or more instruments. Past transactions can include purchases previously made by an individual using one or more of the instruments. The transaction type categories 145 can include categories of transactions made using an instrument. To this end, transaction type categories 145 can include, for example, gas, groceries, transportation, utilities, restaurants, travel and leisure, entertainment, shopping, services, lifestyle, business, and so forth.

Destination accounts 148 can include accounts other than the transaction accounts 154 in which designated payments can be deposited by the fulfillment and notification service 121, for example. Destination accounts 148 can include, for example, a checking account, a savings account, a carbon offset account, a cryptocurrency account, a brokerage account, a charity account, etc. Adjustment settings 151 can include amounts or values used to adjust a transaction. For instance, adjustment settings 151 specified by a user profile 133 can indicate that transactions associated with a particular transaction type category 145 are to be rounded up by a round-up value, and the difference should be deposited into a destination account 148.

As such, the round-up service 114 can be executed to adjust transactions (e.g., round-up transactions) conforming to user-defined criteria, referred to herein as adjustment criteria 127, and make deposits of a portion of the adjusted transactions into a destination account 148 specified by a user. For instance, a consumer may make a purchase of gas in the amount of $6.80. The transaction can be rounded-up to $10, and the $10 is charged to the client via a transaction account 154. An adjustment amount, which can be a difference between the round-up value and the transaction amount, can be deposited into a destination account 148 specified by the user, such as a savings account among others. In the prior example, the adjustment amount is $3.20.

The enrollment service 115 can be executed to enroll a user profile 133 with the round-up service 114. For instance, a user associated with a user profile 133 can own, maintain, or use an instrument offered by a payment instrument provider. To incentivize the user to utilize his or her instrument, the payment instrument provider can permit user profiles 133 to enroll with the round-up service 114, whereby particular transactions specified by a user are rounded up to a nearest dollar amount, five dollar amount, ten dollar amount, etc., and a portion of the transaction is deposited into a destination account 148 specified by the user. Users can be incentivized to save more, offset environmental impact of various purchases, invest in cryptocurrencies or stocks, meet goals for donating to charity, and so forth.

The transaction identification and monitoring service 118 can be executed to access authorized transactions 157, such as those authorized by the transaction and risk authorization service 109. In some embodiments, the transaction identification and monitoring service 118 can maintain a database of authorized transactions 157. The transaction and identification and monitoring service 118 can periodically retrieve authorized transactions 157 from the database and query the database to filter or otherwise identify a subset of the authorized transactions 157 pertaining to the round-up service 114. Alternatively, the transaction and identification and monitoring service 118 can spawn (or execute) a virtual process configured to subscribe with the transaction and risk authorization service 109 and receive a tailored set of the authorized transactions 157, as will be described.

The transaction identification and monitoring service 118 can include a decision engine 160. The decision engine 160 can be executed to apply a round up specified by a user on a transaction. For instance, a user profile 133 can indicate that gas purchases are to be rounded up to the nearest $5 amount. When a gas purchase is identified from the authorized transactions 157 based on a comparison of the gas purchase to the adjustment criteria 127, the decision engine 160 can adjust the gas purchase to round up to the nearest $5 amount (e.g., $42 rounded up to $45).

The fulfillment and notification service 121 can be executed to deposit the adjusted amount (e.g., $3 in the prior example) to a destination account 148 specified by the user, or can direct an appropriate service to do so. Further, the fulfillment and notification service 121 can generate one or more notifications that can be sent to a client device 106 associated with the user profile 133, for instance, by a short message service (SMS), push notification, email, instant message, or other suitable medium. For example, each time a transaction meeting the adjustment criteria 127 is identified, a client device 106 associated with a user profile 133 can be notified. In another example, each time a savings goal has been met, a client device 106 associated with a user profile 133 can be notified.

The transaction and risk authorization service 109 can be executed to authorize a transaction request from a merchant for payment using a transaction account 154 of a user profile 133. When a transaction is authorized, the transaction and risk authorization service 109 can also be configured to notify a merchant service of the transaction, including the merchant requesting the authorization, the amount of the transaction, and the transaction account 156 for which the transaction was authorized. Additionally, the transaction and risk authorization service 109 can send an authentication response to a payment terminal (e.g., a point-of-sale system) where the transaction originates.

The client device 106 is representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 163, such as liquid crystal displays (LCDs), gas plasma-based flat panel displays, organic light emitting diode (OLED) displays, electrophoretic ink ("E-ink") displays, projectors, or other types of display devices. In some instances, the display 163 can be a component of the client device 106 or can be connected to the client device 106 through a wired or wireless connection. The client device 106 can also include one or more wireless transmitters, such as near-field communications (NFC) transmitter, a BLUETOOTH® radio, etc.

The client device 106 can be configured to execute various applications, such as a client application 166 or other applications. The client application 166 can be executed by the client device 106 to enroll a user profile 133 with the round-up service 114 via the enrollment service 115. For example, the client application 166 could represent a mobile banking application that allows a user to access information associated with his or her user profile 133 or to make payments with one or more transaction accounts 156 using his or her client device 106. The client application 166 could also be configured to generate estimated savings based on the user transaction history 142, settings specified by the user during an enrollment process, establish savings goals, generate suggestions for settings for the user profile 133 to meet established savings goals, and so forth.

The client device 106 can also store various types of information for use in the various embodiments of the present disclosure. For example, the client device 106 could store a user identifier 136, which allows a client device 106 to be associated with a user profile 133 of a specific user. However, the client device 106 could also store a device identifier that, if linked to or stored in the user profile 133, would also allow for the client device 106 to be similarly associated with a user profile 133 of a specific user.

FIGS. 2-9 are user interface diagrams depicting an example user experience according to the various embodiments of the present disclosure. Specifically, the user interfaces 200*a* . . . 200*h* (collectively "user interfaces 200") of FIGS. 2-9 can be generated by the client application 166 and presented to a user using the display 163 of the client device 106, as can be appreciated.

Figures 2, 3:
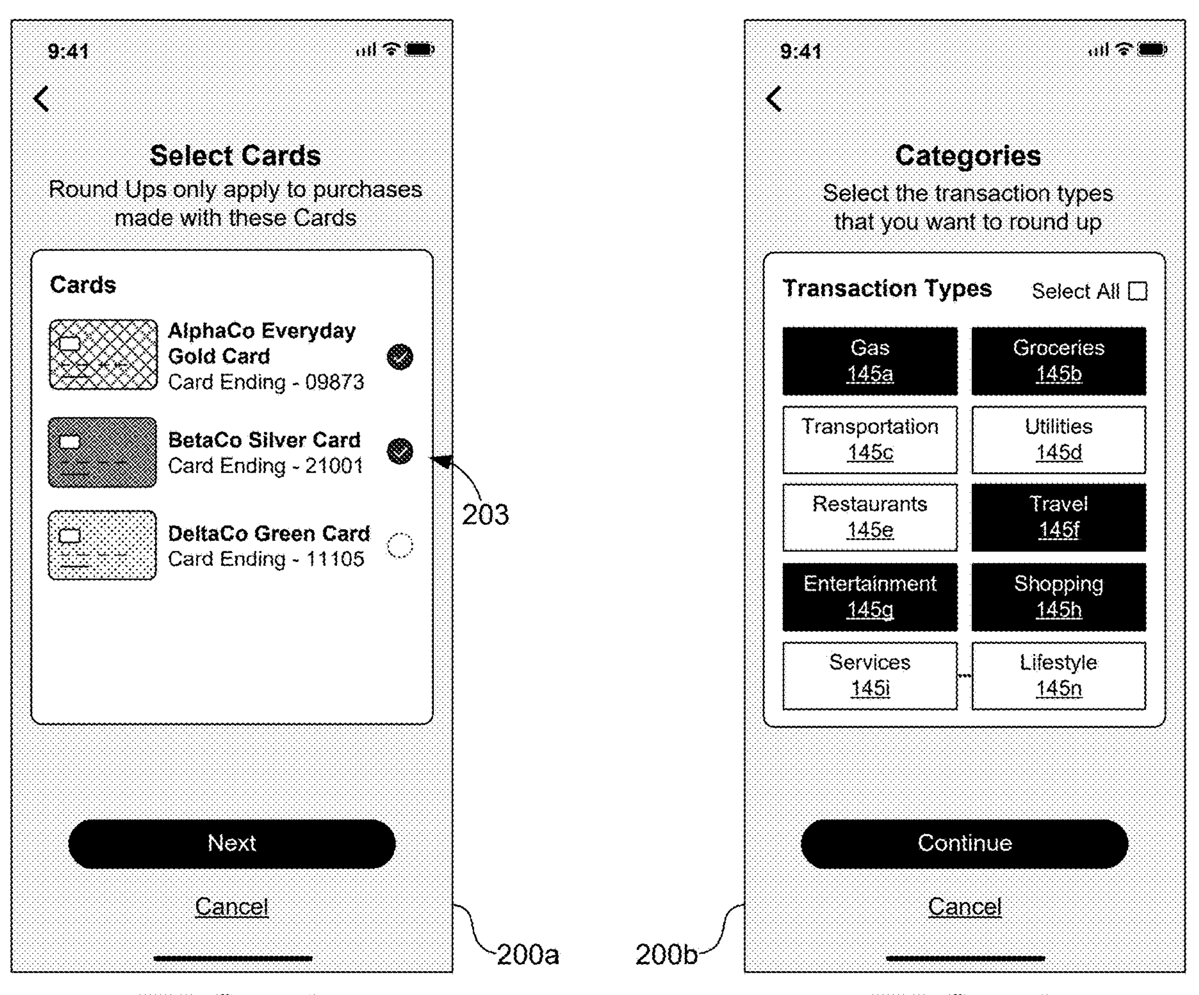
FIGS. 2-9 are user interface diagrams illustrating an example of a user experience according to various embodiments of the present disclosure.

Beginning with FIG. 2, an example of a user interface 200*a* is illustrated for enrolling a user profile 133 with a round-up service 114. The user interface 200*a* can include a multitude of instruments 203 (e.g., transaction cards) that can be selected or otherwise manipulated by a user. For example, the user could have multiple debit cards, credit cards, charge cards, stored-value payment instruments, etc. under his or her control, such as the "AlphaCo Everyday Gold Card," and so forth. The instruments 203 associated with the user profile 133 can be shown in the user interface 200*a*. If one or more of the instruments 203 are selected, any transactions made using the selected instruments 203 would be subject to the round-up service 114 and its operations. In other words, any transactions made using those instruments 203 could be analyzed to apply a round up if additional criteria is satisfied, as will be described.

Referring now to FIG. 3, another example of a user interface 200*b* is illustrated for enrolling the user profile 133 with a round-up service 114. The user interface 200*b* can include a multitude of transaction type categories 145*a* . . . 145*n* (collectively "transaction type categories 145") that can be selected by the user. While some examples of transaction type categories 145 are shown, such as gas, groceries, transportation, and so forth, it is understood that other transaction type categories 145 can be utilized other than the examples shown in FIG. 3. If one or more of the transaction type categories 145 are selected, any transactions associated with one or more of the transaction type categories 145 would be subject to the round-up service 114. The user interface 200*b* of FIG. 3 can be presented before or after the user interface 200*a* of FIG. 2.

Figures 4, 5:
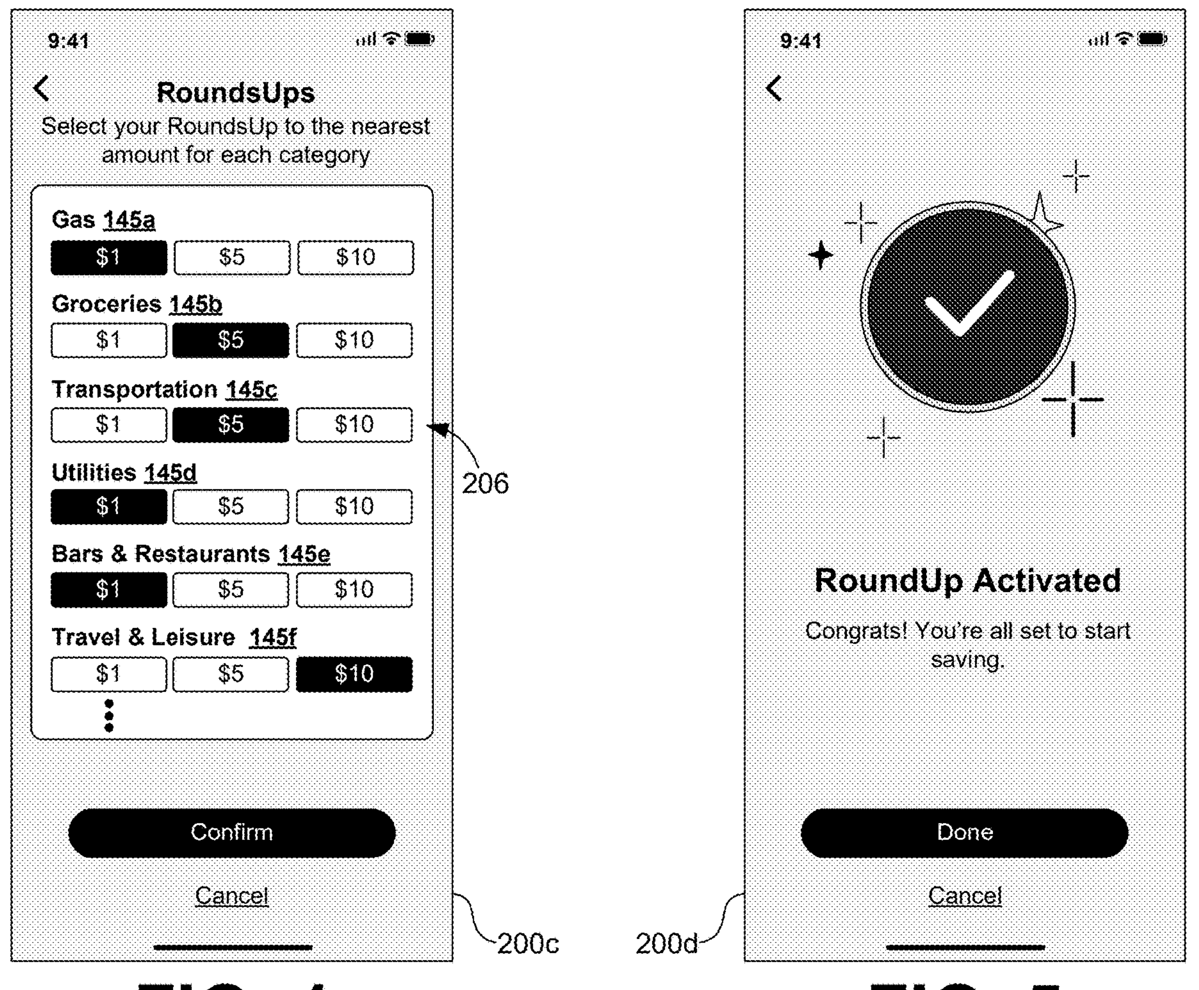

Moving along to FIG. 4, another example of a user interface 200*c* is illustrated for enrolling the user profile 133 with the round-up service 114. Based on the selection of the transaction type categories 145 made in FIG. 3, for example, the user interface 200*b* can include a multitude of round-up values 206 that can be selected by the user for each of the transaction type categories 145. For instance, assuming a user selected the "gas" transaction type category 145 in FIG. 3, different round-up values 206 can be shown in the user interface 200*c* of FIG. 4 to allow the user to customize a round-up value 206 corresponding to that transaction type category 145. While the user interface 200*c* of FIG. 4 shows examples, such as $1, $5, and $10, other round-up values 206 can be shown. Further, in some embodiments, the user can specify a round-up value 206 other than the examples shown in FIG. 4.

The user interface 200*c* of FIG. 4 allows the user to select a round-up value 206 for each of the transaction type categories 145 specified in the user interface 200*b* of FIG. 3. In an instance in which a $1 amount is selected, a transaction associated with that transaction type category 145 is rounded up to the next $1 amount, and the adjustment amount is deposited into an account specified by the user. For instance, if a user has a gas purchase of $40.10, the transaction will be rounded up to $41.00, and $0.90 will be deposited into a destination account 148 specified by the user.

In an instance in which a $5 amount is selected, a transaction associated with that transaction type category 145 is rounded up to the next $5 amount, and the adjustment amount is deposited into an account specified by the user. For instance, if a user has a groceries purchase of $121.63, the transaction will be rounded up to $125.00, and $4.37 will be deposited into a destination account 148 specified by the user. In an instance in which a $10 amount is selected, a transaction associated with that transaction type category 145 is rounded up to the next $10 amount, and the round-up is deposited into an account specified by the user.

In another example, if a user has a travel purchase of $122.42, the transaction will be rounded up to $130.00, and $7.58 will be deposited into a destination account 148 specified by the user. The user interface 200*d* of FIG. 5 indicates that the user profile 133 has successfully enrolled with the round-up service 114. Thereafter, any transactions conforming to the adjustment criteria 127 will be adjusted and round-ups will be deposited into a destination account 148 specified by a user.

Figures 6, 7:
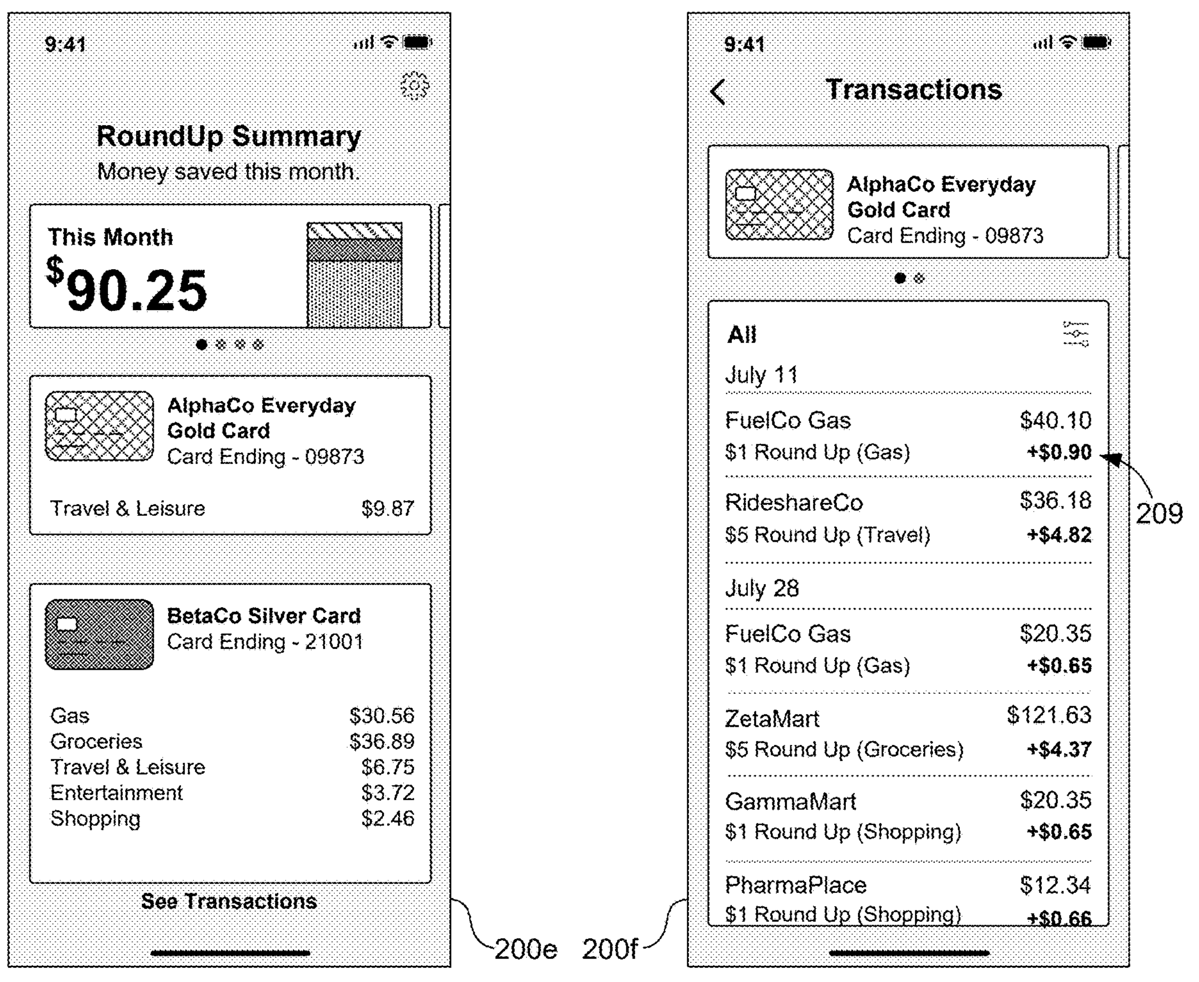

Turning next to FIG. 6, another example of a user interface 200*e* is illustrated for providing a round-up summary for a user profile 133. The round-up summary can include a breakdown of round-ups performed for various transactions, transaction type categories 145, instruments 203, etc. For example, the user interface 200*e* of FIG. 6 shows a summary of round-ups performed for transactions made using the "AlphaCo Everyday Gold Card" as well as a summary of rounds-up performed for transactions made using the "BetaCo Silver Card," which are examples of instruments 203.

By selecting the "See Transactions" component of the user interface 200*e* of FIG. 6, the user interface 200*f* of FIG. 7 can be shown. The user interface 200*f* of FIG. 7 illustrates a detailed listed of the transactions as well as assigned transaction type categories 145. For example, the user interface 200*f* of FIG. 7 shows a summary of transactions performed using the "AlphaCo Everyday Gold Card" instrument 203.

The user interface 200*f* further includes a multitude of adjustment amounts 209 for each of the transaction. The adjustment amounts 209 can be a difference between an original transaction amount (e.g., $40.10) and a round-up value 206 (e.g., $41). For instance, the user interface 200*f* of FIG. 7 indicates that a user purchased gas in the amount of $40.10, where the adjustment amount 209 includes $0.90, which can be deposited into a destination account 148. The gas transaction can be associated with the "gas" transaction type category 145. While the user interface 200*f* of FIG. 7 shows various examples, other adjustment amounts 209 can be employed.

Figure 8:
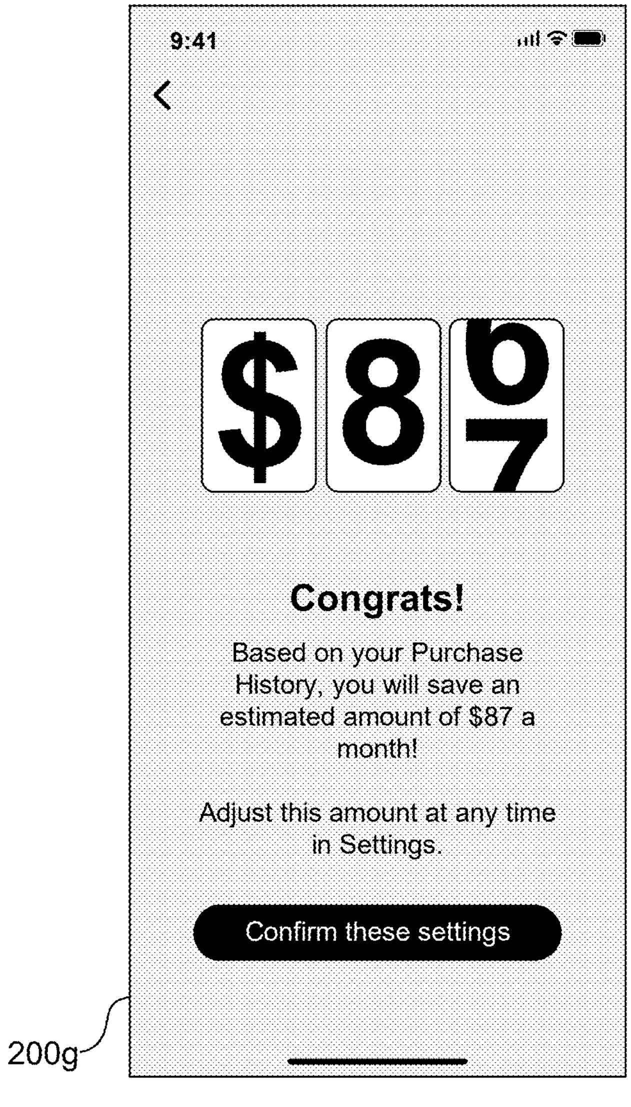

Turning now to FIG. 8, another example of a user interface 200*g* is illustrated for forecasting an estimated savings over a predetermined time interval. The estimated savings can be determined using, for example, the settlings specified in FIGS. 2-6 by the user as well as a user transaction history 142. In some embodiments, the user transaction history 142 can be compared to identify round-ups that would have been applied to past transactions based on the specified instruments 203, transaction type categories 145, round-up values 206, and/or other settings specified by the user. In the example of FIG. 8, it is estimated the user will save $87 a month, although other time intervals can be employed. If the user desires to save more or less, the user can go back to the prior user interfaces 200 to further adjust the configurations.

Figure 9:
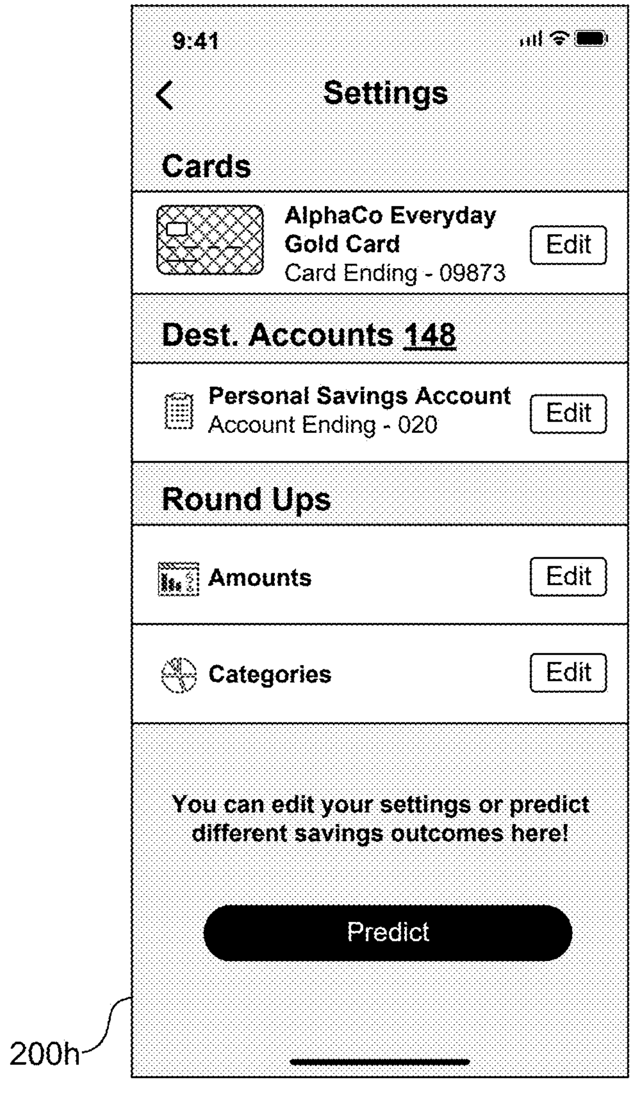

Referring next to FIG. 9, another example of a user interface 200*h* is illustrated that can be accessed after enrolling with the round-up service 114. A user can utilize the user interface 200*h* of FIG. 9 to edit previously-defined adjustment amounts, transaction type categories 145, and the like for one or more instruments 203 (e.g., the "AlphaCo Everyday Gold Card"). The estimated savings can be determined using, for example, the settlings specified in FIGS. 2-6 by the user, for example, as well as a user transaction history 142. In some examples, the user transaction history 142 can be compared to identify round-ups that would have been applied to past transactions based on the specified instruments 203, transaction type categories 145, round-up values 206, and/or other settings specified by the user. Referring again to the example of FIG. 8, while it is estimated the user will save $87 in a given month, other time intervals can be employed. If the user desires to save more or less, the user can go back to the prior user interfaces 200 to further adjust the settings.

Figure 10:
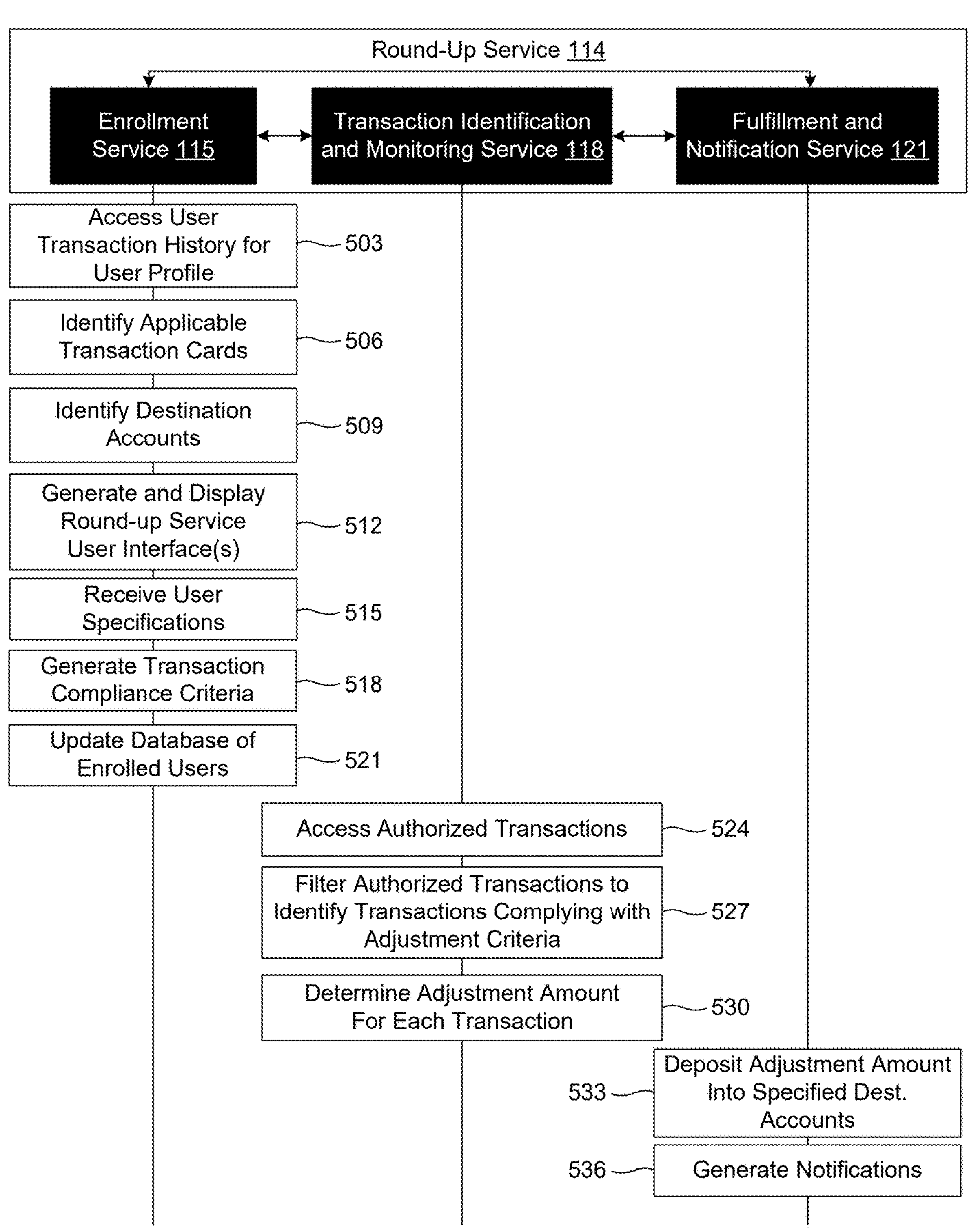
FIG. 10 is a sequence diagram illustrating one example of functionality implemented as portions of an application executed in the network environment of FIG. 1 to identify and adjust transactions based on adjustment criteria according to various embodiments of the present disclosure.

Now, referring to FIG. 10, shown is a sequence diagram that provides one example of the operation of a portion of the round-up service 114. The sequence diagram of FIG. 10 provides merely an example of the many different types of functional arrangements that can be employed to implement the operation of the depicted portion of the round-up service 114. As an alternative, the sequence diagram of FIG. 10 can be viewed as depicting an example of elements of a method implemented within the network environment 100.

It is understood that prior to rounding up transactions performed by a user, a user may enroll with the round-up service 114 so that all consumers of a payment instrument provider are not subject to round ups or similar operations. Through an enrollment process, the user can customize round-up amounts and values, the types of transactions to which the round-ups apply, the instruments 203 to which the round-ups apply, and so forth.

Accordingly, beginning with block 503, for a user profile 133, the enrollment service 115 can access user transaction history 142, for instance, from the data store 124 and/or the transaction and risk authorization service 109. The user transaction history 142 can include past transactions performed using the one or more instruments 203 associated with the user profile 133. Past transactions can include purchases previously made by an individual using one or more of the instruments 203 for goods or services.

Next, in block 506, the enrollment service 115 can identify applicable instruments 203 associated with the user profile 133. The instruments 203 can include, for example, debit cards, credit cards, charge cards, and the like. In other embodiments, a payment instrument 203 can include, for example, a mobile device associated with a transaction card. For instance, a mobile device, such as a smartphone or smart wearable device, can be used to make payments wirelessly (e.g., using NFC communication) by associating a transaction card with the mobile device.

Thereafter, in block 509, the enrollment service 115 can identify one or more destination accounts 148 specified by the user. A destination account 148 can include, for example, a checking account, a savings account, a carbon offset account, a cryptocurrency account, a brokerage account, a charity account, and the like. In some examples, destination accounts 148 can include accounts associated with the user profile 133, such as accounts used to pay credit card invoices and the like.

In block 512, the enrollment service 115 can generate and display one or more user interfaces 200 to assist the user in enrolling his or her user profile 133 with the round-up service 114 using, for example, the information accessed and identified in blocks 703-709. The one or more user interfaces 200 can include the user interfaces 200*a* . . . 200*f* of FIGS. 2-7 in some examples. The enrollment service 115, at block 515, can receive user specifications from the user interfaces 200. User specification can include a specification of one or more instruments 203, transaction type categories 145, round-up values 206 associated with each transaction type categories 145, destination accounts 148, and the like.

In block 518, the enrollment service 115 can generate adjustment criteria 127. For instance, the enrollment service 115 can generate a data object, data structure, or other data representing a criteria for selecting transactions to adjust based on a configuration of a user. Examples of adjustment criteria 127 can include instruments 203 (e.g., transaction cards), transaction type category, adjustment data (e.g., adjustment amounts) associated with one or more transaction type categories, etc. As such, transactions can be compared to the adjustment criteria 127 and, if a sufficient match is determined, the transactions can be adjusted, as will be described.

In block 521, the enrollment service 115 can update the enrolled user database 130, where the enrolled user database 130 can represent data pertaining to user profiles 133 enrolled with the round-up service 114. In some examples, a user identifier 136 for a user profile 133 is added to the enrolled user database 130. In an instance in which the user choses to unenroll, the enrollment service 115 can remove the user identifier 136 from the enrolled user database 130.

Next, in block 524, the transaction identification and monitoring service 118 can access authorized transactions 157 from the transaction and risk authorization service 109. In some embodiments, the transaction identification and monitoring service 118 can access authorized transactions 157 in near real-time or upon a predetermined time interval (e.g., every minute or other suitable time interval).

In some embodiments, the transaction identification and monitoring service 118 can access authorized transactions 157 from the transaction and risk authorization service 109 in real-time or near real-time, meaning within seconds or fractions of a second after the transaction has been authorized. Notably, round-ups that occur in the related art are performed once a week, once a month, and the like, and are not performed in real-time or near real-time. Additionally, in some embodiments, an adjustment of a transaction is made prior to an authentication response being sent by the transaction and risk authorization service 109 to a payment terminal (e.g., a point-of-sale system) where the transaction originates.

In various embodiments, the transaction identification and monitoring service 118 can maintain a database of authorized transactions 157. As such, the transaction and identification and monitoring service 118 can periodically query authorized transactions 157 from the database and filter or otherwise identify a subset of the authorized transactions 157 pertaining to the round-up service 114, for instance, by comparing a user identifier 136 associated with the authorized transactions 157 to the enrolled user database 130.

In block 527, the transaction identification and monitoring service 118 can filter authorized transactions 157 to identify a subset of transactions complying with the adjustment criteria 127. To this end, the transaction identification and monitoring service 118 can first determine whether an authorized transaction 157 associated with a particular user identifier 136 was made by a specified instrument 203. Then, the transaction identification and monitoring service 118 can determine whether the authorized transaction 157 is associated with a specified transaction type category 145.

In block 530, the transaction identification and monitoring service 118 can determine an adjustment amount 209 for each transaction in the subset of transactions complying with the adjustment criteria 127. The adjustment amount 209 can be determined based on a transaction amount and a round-up value 206 specified by the user. For instance, if the round-up value 206 is $1 for transaction associated with "shopping," the adjustment amount 209 for a purchase of $12.34 would be $0.66.

Next, in block 533, the adjustment amount 209 determined in block 530 can be sent to the fulfillment and notification service 121, whereby the fulfillment and notification service 121 can deposit the adjustment amount 209 into a specified destination account 148. Referring to the example above, the adjustment amount 209 of $0.66 could be deposited into one of a checking account, a savings account, a carbon offset account, a cryptocurrency account, a brokerage account, a charity account, a virtual wallet (e.g., a PAYPAL® or a VENMO® account), etc.

Finally, in block 536, the fulfillment and notification service 121 can generate notifications that can be sent to the user or, more specifically, a client device 106 associated with the user profile 133. For example, each time a transaction meeting the adjustment criteria 127 is identified and an adjustment is made, a client device 106 associated with a user profile 133 can be notified. In other embodiments, each time a savings goal established by a user is met, the user can be notified by the fulfillment and notification service 121. Thereafter, the process can proceed to completion. In some examples, the user can login to their settings and pause the enrollment with the round-up service 114, which can stop round-ups from being performed on transactions until the user restarts the enrollment with the round-up service 114.

Figure 11:
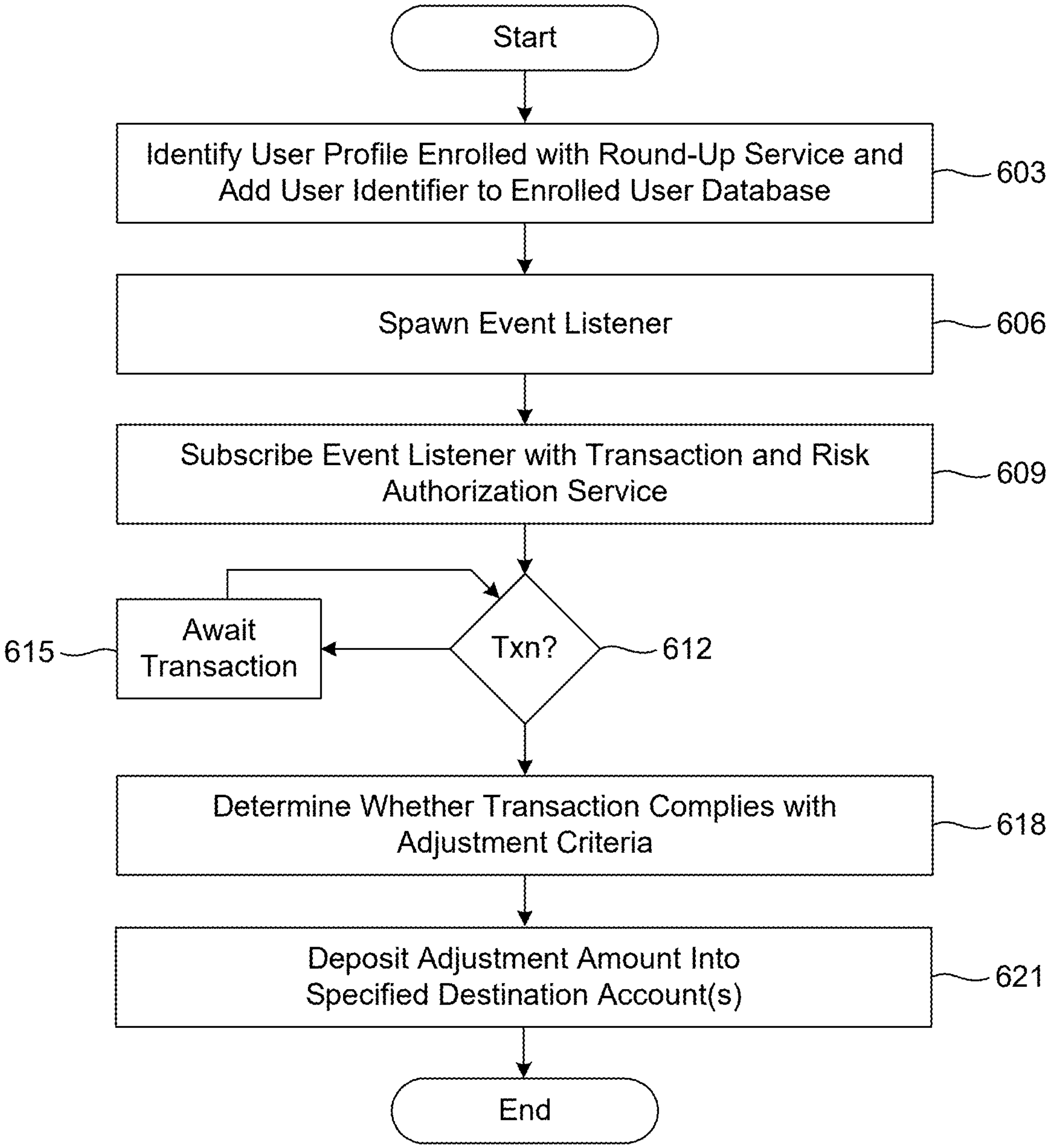
FIGS. 11 and 12 are flowcharts illustrating examples of functionality implemented as portions of an application executed in the network environment of FIG. 1 according to various embodiments of the present disclosure.

Moving along to FIG. 11, a flowchart is shown that provides one example of the operation of a portion of the round-up service 114. The sequence diagram of FIG. 11 provides merely an example of the many different types of functional arrangements that can be employed to implement the operation of the depicted portion of the round-up service 114. As an alternative, the sequence diagram of FIG. 11 can be viewed as depicting an example of elements of a method implemented within the network environment 100.

Beginning with block 603, the round-up service 114 can identify that a user profile 133 has enrolled with the round-up service 114 and add a user identifier 136 corresponding to the user profile 133 to the enrolled user database 130. To this end, the enrolled user database 130 can include data pertaining to user profiles 133 enrolled with the round-up service 114. For When transactions are identified, instead of querying a potentially massive database of every user profile 133, only the enrolled user database 130 is queried to determine whether a transaction should be adjusted by the round-up service 114.

Next, in block 606, the round-up service 114 can spawn an event listener. For instance, when a user profile 133 is enrolled with the round-up service 114, the round-up service 114 can spawn the event listener. Spawning an event listener can include generating virtual computing process and executing the virtual computing process on a suitable computing device (e.g., the computing environment 103).

The event listener can include a virtual process that monitors transactions made by a user profile 133 or a group of user profiles 133. In some examples, the virtual process can include a thread, virtual machine, or other virtual process. In further examples, the virtual process is a process that sleeps or remains dormant, not utilizing any computing resources. The event listener, however, can awaken at predefined time intervals and execute predetermined code. When awakened, the predetermined code can direct the event listener to check for any new transactions made by a user identifier corresponding to the user profile 133 by querying a database of authorized transactions 157, for example, or be sending another suitable request to the transaction and risk authorization service 109.

In some examples, the event listener does not receive (or the transaction and risk authorization service 109 does not report) certain predefined transactions. In some examples, transactions having an even amount (e.g., $1.00, $3.00, and $100.00) as no round-ups might occur. Further, in some examples, transactions having an amount less than a predefined threshold (e.g., $2.00) may not be reported, may not be received, or can be ignored. Based on the foregoing, the event listener provides an improved efficiency in usage of network and computing resources as the event listener subscribes to particular transactions of interest, as opposed to analyzing each and every authorized transaction 157.

In box 609, the round-up service 114 can subscribe the event listener with the transaction and risk authorization service 109 such that the event listener is notified when a transaction associated with a particular user profile 133 is made. For instance, the event listener can provide the transaction and risk authorization service 109 with one or more user identifiers 136 for which the event listener is monitoring. As such, when the transaction and risk authorization service 109 identifies a transaction associated with one or more of the user identifiers 136, the transaction and risk authorization service 109 can notify the event listener.

To this end, in block 612, the round-up service 114 can determine whether a transaction has been received. If no transaction has been received, the process can proceed to block 615 where the round-up service 114 continues to await a transaction. However, if a transaction has been received, the process can proceed to block 618.

In block 618, the round-up service 114 can determine whether the transaction complies with the adjustment criteria 127. The transaction can include a user identifier 136 corresponding to a user profile 133. As such, the round-up service 114 can retrieve adjustment criteria 127 from the data store 124 based on the user identifier 136 and perform a comparison of the transaction with the adjustment criteria 127.

As one example, the round-up service 114 can determine whether the transaction was performed using an instrument 203 specified by the user in the user interface 200. In another example, a transaction can be categorized to determine whether the transaction complies with a transaction type category 145 specified by the user.

If the transaction complies with the adjustment criteria 127, in block 621, the round-up service 114 can determine and deposit an adjustment amount 209 into a specified destination account 148. The adjustment amount 209 can be determined based on a transaction amount and a round-up value 206 specified by the user. For instance, if the round-up value 206 is $5 for transaction associated with "travel," the adjustment amount 209 for a purchase of $12.34 would be $2.66.

To accomplish this, the round-up service 114 can determine that a first transaction is associated with a first transaction type category 145 (e.g., "travel") and determine a first round-up value 206 (e.g., $5) associated with the first transaction type category 145. The round-up service 114 can adjust the first transaction based at least in part on the first round-up value 206, for instance, by rounding up the transaction amount to the nearest $5 increment. Similarly, the round-up service 114 can determine that a second transaction is associated with a second transaction type category 145 (e.g., "gas") and determine a second round-up value 206 (e.g., $1) associated with the second transaction type category 145. The round-up service 114 can adjust the second transaction based at least in part on the second round-up value, for instance, to round up the transaction to a nearest dollar. Adjustment amounts 209 (e.g., the difference between the transaction amount and the round-up value 206) can be deposited in one or more destination accounts 148. Thereafter, the process can proceed to completion.

Figure 12:
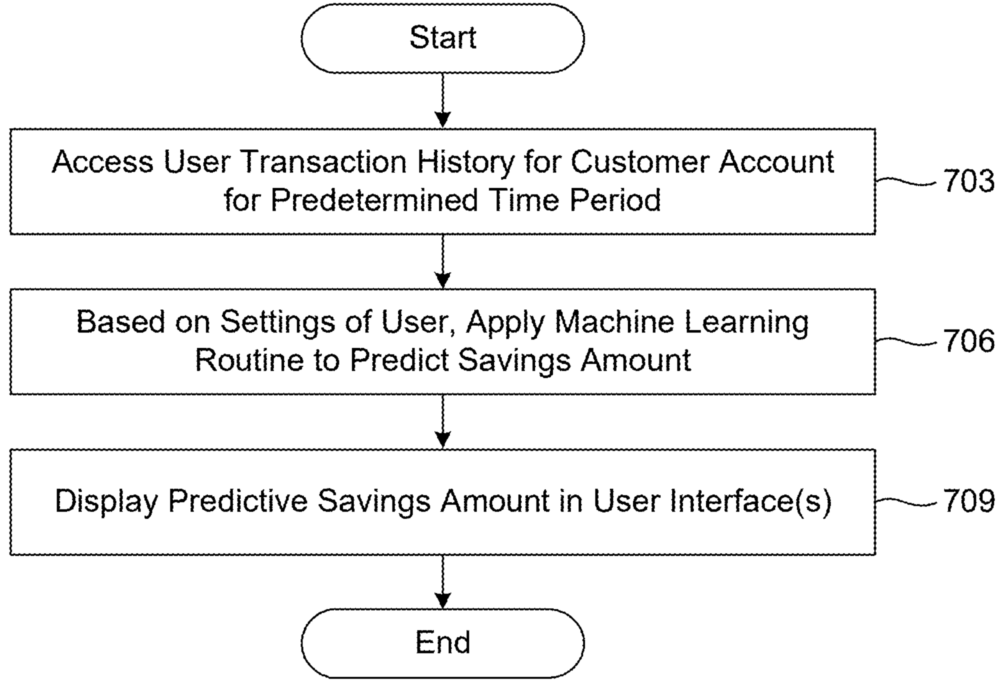

Turning now to FIG. 12, a flowchart is shown that provides one example of the operation of a portion of the round-up service 114. The sequence diagram of FIG. 12 provides merely an example of the many different types of functional arrangements that can be employed to implement the operation of the depicted portion of the round-up service 114. As an alternative, the sequence diagram of FIG. 12 can be viewed as depicting an example of elements of a method implemented within the network environment 100.

Beginning with block 703, the round-up service 114 can access the user transaction history 142 for a predetermined period of time, such as a last month, a last quarter, a last year, etc., for a given user profile 133. The user transaction history 142 can include past transactions performed using one or more instruments 203, where the past transactions can include purchases previously made by an individual using one or more of the instruments 203.

Next, in block 706, the round-up service 114 can apply a machine learning routine to predict a savings amount, for instance, based on the settings specified by the user in the one or more user interfaces 200. For instance, inputs to the machine learning routine can include the user transaction history 142, the transaction type categories 145 specified by the user, the round-up values 206 specified by the user, and so forth. In some embodiments, the machine learning routine is a supervised or a non-supervised machine learning routine, and can include an artificial neural network (ANN) routine, a convolutional neural network (CNN) routine, a linear regression routine, and the like.

Prior to utilizing the machine learning routines, the machine learning routines can be trained using training data. In some examples, training data can include manually verified training data. The manually verified training data can include, for instance, transaction histories of other users, transaction type categories 145 made by other users, round-up values specified by other users, a confirmed monthly savings based on those settings, among other inputs. The machine learning routine, when trained, may output a predicted savings amount in some examples.

Finally, in block 709, the round-up service 114 can display the predictive savings amount in a user interface 200. For instance, the user interface 200*g* of FIG. 8 displays a forecasted savings over a predetermined time interval, such as one month. In the example of FIG. 8, it is estimated the user will save $87 a month, other time intervals can be employed. If the user desires to save more or less, the user can go back to the prior user interfaces 200 to further adjust the settings. Thereafter, the process can proceed to completion.

Figure 13:
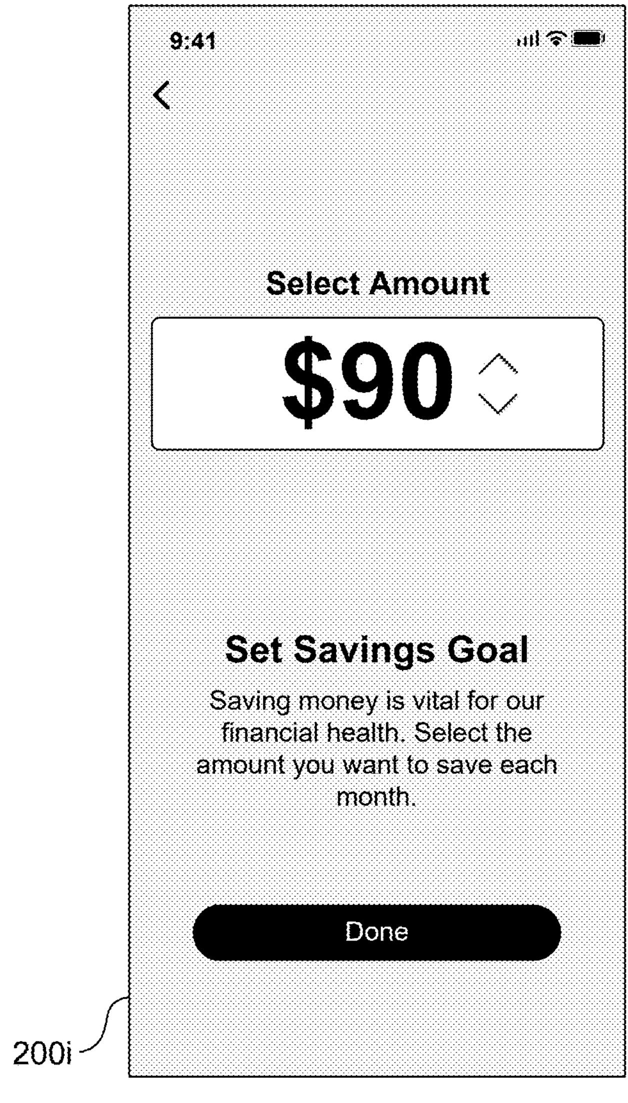
FIG. 13 is a user interface diagram illustrating an example of a user experience according to various embodiments of the present disclosure.

Referring next to FIG. 13, another example of a user interface 200*i* is illustrated for allowing users to specify a savings goal or, in other words, a predetermined savings amount. The round-up service 114 can utilize the user interaction history 142 of the user and the predetermined savings amount to generate suggested configurations of the transaction type categories 145 and the round-up values 206 to reach the predetermined savings amount over a predefined time interval (e.g., a month, a quarter, a half a year, and a year).

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory;

an enrolled user database; and machine-readable instructions stored in the memory that, when executed by the processor, cause the computing device to perform operations comprising:

receive a specification comprising an instrument, a predetermined amount, a transaction type category, and a destination account from at least one client device associated with a user profile;

generate adjustment criteria based at least in part on the transaction type category and the instrument;

add, from a user database, the user profile to a set of enrolled user profiles of the enrolled user database;

access, from the enrolled user database, adjustment criteria for the user profile;

generate an event listener, the event listener comprising a virtual computing process configured to monitor a plurality of events associated with the user profile;

subscribe to the event listener for the user profile;

receive at least an event of the plurality of events from the event listener, the event being made in association with the user profile;

in response to receiving at least the event of the plurality of events from the event listener, filter the plurality of events to identify a subset of the plurality of events that comply with the adjustment criteria; and adjust individual ones of the events in the subset by performing a round-up operation, the round-up operation comprising adjusting an event amount by the predetermined amount and depositing the predetermined amount into the destination account.

2. The system of claim 1, wherein the specification further comprises a round-up value; and wherein the adjustment criteria comprises the round-up value event amount being adjusted to the round-up value.

3. The system of claim 2, wherein the machine-readable instructions further cause the computing device to perform operations comprising:

access historical transaction data for the instrument; and prior to the adjustment criteria being generated, determine an estimated savings over a predetermined time interval based at least in part on the historical transaction data.

4. The system of claim 1, wherein:

each of the events in one of a plurality of transactions; and individual ones of the transactions in the subset are adjusted by performing the round-up operation by:

determining that a first one of the transactions is associated with a first transaction type category;

determining a first round-up value associated with the first transaction type category;

adjusting the first one of the transactions to the first round-up value;

determining that a second one of the transactions is associated with a second transaction type category;

determining a second round-up value associated with the second transaction type category; and adjusting the second one of the transactions to the second round-up value.

5. The system of claim 4, wherein the machine-readable instructions further cause the computing device to perform operations comprising:

determine a first adjustment amount that is a difference between an amount of the first one of the transactions and the first round-up value;

determine a second adjustment amount that is a difference between an amount of the second one of the transactions and the second round-up value; and deposit the first adjustment amount and the second adjustment amount in the destination account.

6. The system of claim 1, wherein the destination account is one of a checking account, a savings account, a carbon offset account, a cryptocurrency account, a brokerage account, and a charity account.

7. A method, comprising:

accessing, by a computing device, a specification of an instrument, a round-up value, a category, and a destination account from at least one user interface of a client application associated with a user profile;

generating, by the computing device, adjustment criteria based at least in part on the category, the round-up value, and the instrument;

adding, by the computing device and from a user database, the user profile to a set of enrolled user profiles of an enrolled user database;

generating, by the computing device, an event listener, the event listener comprising a virtual computing process configured to monitor a plurality of events;

subscribing, by the computing device, to the event listener to receive notifications in association with the user profile;

receiving, by the computing device and in response to the event listener identifying the plurality of events being approved by a remote service, a notification from the event listener;

accessing, by the computing device and from the enrolled user database, the adjustment criteria associated with the user profile;

in response to the plurality of events being approved by the remote service, filtering, by the computing device, the plurality of events to identify a subset of the plurality of events that comply with the adjustment criteria that are associated with the instrument;

adjusting, by the computing device, individual ones of the events in the subset by performing a round-up operation on the individual ones of the events, the round-up operation comprising adjusting a transaction amount of the individual ones of the events based at least in part on the round-up value; and depositing, by the computing device, an adjustment amount into the destination account, the adjustment amount being a difference between the transaction amount and the round-up value.

8. The method of claim 7, further comprising:

identifying, by the computing device, the subset of the events based at least in part on a filtering of a plurality of authorized events using the enrolled user database.

9. The method of claim 8, wherein:

the category is a transaction type category;

the events are transactions; and the authorized events are authorized transactions; and the filtering of the authorized events comprises:

determining, by the computing device, whether individual ones of the authorized transactions are associated with a particular user identifier associated with the instrument; and determining, by the computing device, that the individual ones of the authorized transactions are associated with the transaction type category based at least in part on a categorization of the individual ones of the authorized transactions.

10. The method of claim 8, further comprising:

accessing, by the computing device, user transaction history data for the user profile;

based on the specification of the instrument, the round-up value, and the category, predicting, by the computing device, a savings amount over a predefined time interval; and displaying, by the computing device, the savings amount as predicted in the at least one user interface.

11. The method of claim 10, wherein predicting the savings amount over the predefined time interval comprises training, by the computing device, a machine learning routine and providing, by the computing device, the machine learning routine with the instrument, the round-up value, and the category, the machine learning routine being configured to output the savings amount as predicted.

12. The method of claim 8, further comprising:

subscribing, by the computing device, the event listener with the remote service such that, when authorized events associated with the user profile are detected, the remote service notifies the event listener.

13. The method of claim 8, wherein:

the instrument is one of a plurality of instruments specified in the at least one user interface;

the round-up value is one of a plurality of round-up values specified in the at least one user interface; and the category is one of a plurality of transaction type categories specified in the at least one user interface, wherein individual ones of the round-up values correspond to individual ones of the transaction type categories.

14. The method of claim 8, further comprising:

prior to receiving the specification of the instrument, the round-up value, and the category from the at least one user interface of a client application, receiving, by the computing device, a specification of a savings goal in the at least one user interface; and generating, by the computing device, at least one suggestion for the instrument, the round-up value, and the category that, if selected, satisfy the savings goal.

15. A non-transitory, computer-readable medium comprising machine-readable instructions that, when executed by a processor of a computing device, cause the computing device to perform operations comprising:

access a specification of an instrument, a first round-up value, a first transaction type category, a second round-up value, a second transaction type category, and a destination account from at least one user interface of a client application associated with a user profile;

generate a first adjustment criteria based at least in part on the first round-up value and the first transaction type category;

generate a second adjustment criteria based at least in part on the second round-up value and the second transaction type category;

add, from a user database, the user profile to a set of enrolled user profiles of an enrolled user database;

generate an event listener, the event listener comprising a virtual computing process configured to monitor ones of a plurality of transactions made in association to the instrument;

subscribe to the event listener to receive notifications when a remote service approves ones of a plurality of transactions made in association to the instrument;

receive a notification from the event listener, the notification being sent by the event listener in response to identifying the plurality of transactions being approved by a remote service and in response to associated with the user profile and in response to a remote service approving the transaction;

access, from the enrolled user database and in association with the user profile, the first adjustment criteria and the second adjustment criteria;

in response to a plurality of transactions being approved by a transaction service, filter the plurality of transactions to identify a first subset of the plurality of transactions that are associated with the first transaction type category;

in response to a plurality of transactions being approved by a transaction service, filter the plurality of transactions to identify a second subset of the plurality of transactions that are associated with the second transaction type category;

adjust individual ones of the plurality of transactions in the first subset by to the first round-up value and deposit a first adjustment amount into the destination account, the first adjustment amount being a difference between a transaction amount of the transactions in the first subset and the first round-up value; and adjust individual ones of the plurality of transactions in the second subset by to the second round-up value and deposit a second adjustment amount into the destination account, the second adjustment amount being a difference between a transaction amount of the transactions in the second subset and the second round-up value.

16. The non-transitory computer-readable medium of claim 15, wherein the machine-readable instructions further cause the computing device to perform operations comprising:

identify the first subset and the second subset of the transactions based at least in part on a filtering of a plurality of authorized transactions using the enrolled user database.

17. The non-transitory computer-readable medium of claim 16, wherein the machine-readable instructions further cause the computing device to perform operations comprising filtering the authorized transactions by:

determining whether individual ones of the authorized transactions are associated with a particular user identifier associated with the instrument; and determining that the individual ones of the authorized transactions are associated with the first transaction type category and the second transaction type category based at least in part on a categorization of the individual ones of the authorized transactions.

18. The non-transitory computer-readable medium of claim 15, wherein the destination account is one of a checking account, a savings account, a carbon offset account, a cryptocurrency account, a brokerage account, and a charity account.

19. The non-transitory computer-readable medium of claim 15, wherein the machine-readable instructions further cause the computing device to perform operations comprising:

subscribing the event listener with a transaction service such that, when authorized transactions associated with the user profile are detected, the transaction service notifies the event listener.

20. The system of claim 1, wherein the virtual computing process of the event listener is a process that remains dormant without expending additional computing resources until the process wakes at predefined time intervals to check for new transactions made by the user profile in the set of enrolled user profiles of the enrolled user database.

* * * * *